AVAILABILITY OF $P_2O_5$ AS AFFECTED BY AMMONIATION PROCEDURE

EFFECT OF IMPURITY CONTENT AND MAXIMUM REACTION TEMPERATURE ON $P_2O_5$ AVAILABILITY IN PRIOR TWO-STAGE AMMONIATION OF WET PROCESS ACID.

TWO-STAGE AMMONIATION PROCESS WITH
IN-LINE MIXING FOR PRODUCTION
OF AMMONIUM POLYPHOSPHATE

THREE-STAGE AMMONIATION PROCESS
FOR PRODUCTION OF AMMONIUM POLYPHOSPHATE

BATCH AMMONIATION PROCESS FOR PRODUCTION OF AMMONIUM POLYPHOSPHATE MELT

United States Patent Office 3,562,778
Patented Feb. 9, 1971

3,562,778
PROCESS FOR THE PRODUCTION OF AMMONIUM POLYPHOSPHATE
Milton R. Siegel and Horace C. Mann, Jr., Florence, Ala., assignors to Tennessee Valley Authority, a corporation
Filed Aug. 7, 1967, Ser. No. 658,962
Int. Cl. C05b 7/00
U.S. Cl. 71—34                                                                    1 Claim

ABSTRACT OF THE DISCLOSURE

Improved process for the production of high-analysis solid and liquid ammonium polyphosphate fertilizers of high $P_2O_5$ polyphosphate and availability levels from wet-process phosphoric acid and ammonia. The acid is ammoniated so that the bulk of the ammonia is fixed while the polyphosphate level is low and then the polyphosphate level is increased to the desired value.

---

The invention herein described may be manufactured and used by or for the Government for governmental purposes without the payment to us of any royalty therefor.

Our invention relates to an improvement in liquid and solid fertilizers and an improved process of production; more particularly to a process for the manufacture of highly concentrated liquid and solid mixed fertilizers produced directly from the ammoniation of phosphoric acid of the wet-process type; and more particularly to the production of such highly concentrated liquid and solid mixed fertilizers by the ammoniation of wet-process phosphoric acid wherein the previously required separate step of concentrating said wet-process phosphoric acid up to the range of superphosphoric acid is entirely eliminated; and still more particularly to the ammoniation of wet-process phosphoric acid under conditions in which a large proportion of the total ammonia is fixed prior to final dehydration in which the bulk of the polyphosphate is fixed, said process for production of ammonium polyphosphate characterized by the fact that the product therefrom is substantially free from unavailable $P_2O_5$ allowing the use of acid with moderate to high contents of impurities. The necessary conditions can be obtained by batch ammoniation of wet-process acid or by continuous ammoniation in two or more stages.

Liquid mixed fertilizers having compositions similar to those of standard dry mixed fertilizers are well known in the industry and are increasing in popularity. Such solutions have the advantages over dry mixed fertilizers in that costs of evaporating water and bagging are eliminated and application to the soil is greatly simplified. Moreover, the use of liquid fertilizers eliminates difficulty due to segregation and caking often encountered in the storing of dry fertilizers.

However, liquid fertilizers have had some outstanding disadvantages. Raw-material costs have been relatively high and the solutions produced have, in the past, been so corrosive as to result in high maintenance and storage costs. The solutions also, in the past, have been limited to a maximum plant food content of about 33 percent by weight because experience has taught that concentration in excess of this amount always has resulted in crystallization and precipitation of salts. These disadvantages, in many instances, outweighed the benefits derived by elimination of the evaporation and bagging steps.

One of several recent breakthroughs in overcoming these disadvantages in liquid mixed fertilizers is taught and described in U.S. Pat. 2,950,961, Striplin et al. Striplin has discovered that he is able to prepare a liquid mixed fertilizer containing substantial values of both N and $P_2O_5$ in a process wherein he rapidly and intimately introduces ammonia and superphosphoric acid into a reaction vessel under controlled conditions. As is taught by Striplin, the superphosphoric acid utilized in his process is ammoniated in such a way that the resulting ammonium polyphosphate salts which comprise his liquid fertilizers are proportioned in his product in substantially the same dependent and proportional relationship as are the various species of polyphosphoric acids originally present in his superphosphoric acid constituent. It is believed that the retention of these species of nonequilibrated polyphosphoric acids as the ammonium salts thereof is beneficial in restraining the precipitation of salts in his product solution.

In another fairly recent breakthrough in overcoming the disadvantages of liquid mixed fertilizers produced by the prior-art methods, there is found in application Ser. No. 835,377, John G. Getsinger, assigned to the assignee of the present application, the discovery that if phosphoric acid of the wet-process type is subjected to evaporating means, either at atmospheric or at reduced pressure, so as to condense the wet acid and raise its $P_2O_5$ content up to the range of approximately 60 to 76 percent $P_2O_5$, the formation of gelatinous precipitates which otherwise render wet-process phosphoric acid unusable for the preparation of high-analysis liquid mixed fertilizers are substantially sequestered. In addition, there is taught in said application that if wet-process phosphoric acid is so concentrated, it may then be subsequently ammoniated to form liquid mixed fertilizers in which the congeneric impurities originally present in said wet-process phosphoric acid are sequestered and caused to remain in solution, thereby eliminating the formation of said gelatinous precipitates. Substantially the same teachings wherein commercial grade wet-process phosphoric acid is concentrated and then subsequently ammoniated to form liquid mixed fertilizers is also found in U.S. Pat. 3,044,851, D. C. Young. As may be seen from the disclosures enumerated supra, it is now known in the art how to produce liquid mixed fertilizers having plant nutrient values comparable to many standard dry mixed fertilizers and, in addition, to the preparation of said liquid fertilizers by such means and in such forms so as to substantially overcome many of the disadvantages originally inherent in the production of liquid fertilizers prior to the Striplin disclosure. As may also be seen from a consideration of the economics involved, it is, in many cases, more highly desirable to produce such liquid mixed fertilizers by the ammoniation of concentrated wet-process superphosphoric acid rather than from the ammoniation of the cleaner, but more highly expensive, superphosphoric acid of the electric furnace type.

And in still another fairly recent breakthrough in overcoming some of the disadvantages of liquid and solid mixed fertilizers produced by the prior-art methods, there is found in U.S. Pats. 3,171,733, 3,228,752, and 3,264,085, Hignett et al. assigned to the assignee of the present invention the discovery of new compositions of matter and methods for their production which contain up to about 80 percent of their weight in the form of available plant food and which are produced by a process of directly reacting anhydrous ammonia with superphosphoric acid at elevated temperatures and pressures. These compositions of matter may either be directly applied to the soil as a solid fertilizer or, may be shipped from the point of manufacture to the intended point of usage and then subsequently simply be dissolved in water, thereby effecting the production of high-analysis liquid mixed fertilizer suitable for application to the soil. In this teaching of Hignett, et al. the feed material for the reactor is anhydrous ammonia and superphosphoric acid, either of the electric-furnace type or wet-process type. In his teaching polyphosphate is present in the superphosphoric acid prior to ammoniation. This requirement necessitates, when said superphosphoric acid is derived from the leaching of phosphate rock by sulfuric acid, i.e., wet-process acid, of concentrating the ordinary or merchant grade wet-process acid up to the superphosphoric range by means of a separate and fairly costly concentration step in that special equipment and materials of construction must be used to insure against the corrosive characteristics of acid so concentrated, and in the thermal requirements from the fuel to be used therein.

And in still another and most recent breakthrough in overcoming some of the disadvantages of liquid and solid mixed fertilizers produced by the prior-art methods there is found in U.S. application Ser. No. 380,743 now U.S. Pat. 3,382,059, John G. Getsinger, assigned to the assignee of the present invention the discovery of a process for the production of highly concentrated liquid and solid mixed ammonium polyphosphate fertilizers produced by the ammoniation of phosphoric acid of the wet-process type which overcome certain of these disadvantages of the prior art and which will greatly influence an economic swing to the use of wet-process acid as the starting constituent rather than the more highly priced electric furnace type acid. He has developed a reliable, simple, and efficient method for the production of liquid and solid ammonium polyphosphate fertilizers by utilizing ordinary merchant-grade wet-process phosphoric acid in the $P_2O_5$ content range from about 50 to 58 percent by weight wherein the separate step of subjecting said acid to an evaporating step to increase its $P_2O_5$ content up to the "super" range (60–80% $P_2O_5$) is substantially eliminated, thereby greatly improving on the economics involved.

Further, Getsinger has found that, in carrying out his process for the manufacture of liquid and solid mixed fertilizers by the ammoniation of merchant-grade wet-process phosphoric acid, he can utilize the free heat of ammoniation to evaporate water and form polyphosphates rather than require the use of expensive heat from fossil fuel. His process accomplishes the two functions of ammoniation and concentration simultaneously instead of using two separate process steps. In addition, in his process the evaporation of water is from a relatively noncorrosive acid salt solution instead of from a highly corrosive acid, thus allowing the use of less expensive materials of construction when carrying out his process.

We have discovered that although the two-stage ammoniation process of Getsinger is a new and useful tool in producing ammonium polyphosphates by a method which substantially eliminate the necessity of first separately concentrating wet-process phosphoric acid from merchant-grade strength, up to the superphosphoric acid range (about 60 to about 80 percent $P_2O_5$) it has certain limitations, the greatest of which perhaps is the degree of availability of the total $P_2O_5$ content of the ammonium polyphosphate produced thereby. It should be understood that $P_2O_5$ availability referred to is determined by standard procedures used in the fertilizer industry and defined in the Official Methods of Analysis of the Association of Official Agricultural Chemists, 10th edition, 1965, published by the Association of Official Agricultural Chemists, Washington, D.C. It has been found that highly desirable products can be produced by the two-stage ammoniation process of Getsinger only when the feed acids contain relatively low metallic impurity contents or low polyphosphate contents. The metallic impurity content may be expressed as the $R_2O_3:P_2O_5$ mole ratio wherein $R_2O_3$ symbolizes the weight percent of the total of the two principal metallic impurities, iron and aluminum, reported as their oxides. For example, depending on the maximum operating temperature of the two-stage ammoniation process of Getsinger, we have found that the percentage of $P_2O_5$ availability falls off rapidly from substantially 100 percent when the $R_2O_3:P_2O_5$ mole ratio is greater than about 0.04. In the Getsinger process essentially all of the ammoniation and dehydration of the orthophosphoric acid occurs in the second stage; the first stage is used essentially to recover the ammonia evolved from the second stage in order to prevent an ammonia loss from the process. As a result undesirable reactions occur with the metallic impurities present in the acid to form compounds that contain substantial portions of the $P_2O_5$ in a form that is unavailable to the growing plant. Whereas on the other hand, in our new and improved ammoniation process the ammoniation is carried out in such a manner that, first, a high proportion of the ammonia is fixed while the polyphosphate content is low and then the final dehydration of the orthophosphate to polyphosphate occurs with the result that the undesirable reactions that result in the formation of the unavailable $P_2O_5$ do not occur. As a result, we can obtain substantially 100 percent $P_2O_5$ availability when the $R_2O_3:P_2O_5$ mole ratio in the wet-process phosphoric acid feed is as great as about 0.1.

The value of the phosphorus content of phosphatic fertilizers is based only on those portions of the phosphate which are "available" to the growing plant and not on the total amount of phosphate that is present. In this country the amount of "available" phosphate present is defined by law on the basis of standardized procedures published in the Official Methods of Analysis of the Association of Official Agricultural Chemists. These procedures consist essentially in determining those portions of phosphate which are soluble in neutral ammonium citrate solution. Such soluble phosphates are referred to as "available" phosphates. Van Wazer (Phosphorus and Its Compounds, volume II, 1961, published by Interscience Publishers, Inc., New York) states in part that "this procedure attempts to duplicate the dissolving power exerted by the fluids in the root system of a living plant on the phosphates present in the soil. Obviously, such a procedure cannot be a perfect representation of availability since different plants, soils, and weather conditions cannot be taken into account. However, extensive agronomic studies have shown reasonably good correlation, and the procedure is accepted by the governmental agencies and the fertilizer industry in the United States."

An illustrative example of the beneficial effect of forming the polyphosphate at high rather than low degrees of ammoniation is shown in Table I below and also graphically in FIG. 1.

TABLE I.—PRODUCTION OF AMMONIUM POLYPHOSPHATE BY BATCH AMMONIATION [1]

| Test No. | Time, min. | Temperature, °F. | Composition, percent by wt. | | | Lb. NH$_3$/unit P$_2$O$_5$ | Percent of total P$_2$O$_5$ as— | |
|---|---|---|---|---|---|---|---|---|
| | | | N | P$_2$O$_5$ | H$_2$O | | Available P$_2$O$_5$ | Polyphosphate P$_2$O$_5$ |
| Polyphosphate Formation at High Degrees of Ammoniation (Procedure A) | | | | | | | | |
| 38 | 0 | 250 | 1.7 | 53.0 | 20.8 | 0.8 | | |
| | 4 | 315 | 8.9 | 58.5 | 4.1 | 3.7 | 100 | 6 |
| | 6 | 400 | 12.3 | 59.0 | | 5.1 | | 37 |
| | 8 | 415 | 12.9 | 59.0 | | 5.3 | 100 | 49 |
| | 12 | 4.0 | 13.1 | 59.7 | | 5.3 | 100 | 61 |
| | 16 | 450 | 12.7 | 61.1 | | 5.1 | 100 | 76 |
| 65 | 0 | 250 | 0.2 | 54.4 | 21.4 | 0.1 | | |
| | 3 | 350 | 8.4 | 59.9 | 5.2 | 3.4 | 100 | 12 |
| | 6 | 425 | 11.6 | 60.8 | | 4.6 | 100 | 51 |
| | 7 | 460 | 12.1 | 61.3 | | 4.8 | 99 | 55 |
| | 16 | 480 | 12.1 | 60.6 | | 4.8 | 99 | 80 |
| Polyphosphate Formation at Low Degrees of Ammoniation (Procedure B) | | | | | | | | |
| 102 | 5 | 250 | 4.0 | 52.4 | 19.0 | 1.8 | 99 | 2 |
| | 13 | 350 | 4.8 | 64.0 | 2.3 | 1.8 | 100 | 14 |
| | 16 | 450 | 4.9 | 67.0 | | 1.8 | 99 | 40 |
| | 20 | 450 | 11.8 | 62.1 | | 4.6 | 91 | 56 |
| | 26 | 450 | 12.9 | 63.1 | | 5.0 | 90 | 76 |

[1] Acid used was produced from Florida rock and had the following analysis:

Analysis, percent by wt.:
Total P$_2$O$_5$ ---------------------------------------------- 54.6
Fe$_2$O$_3$ ---------------------------------------------- 2.3
Al$_2$O$_3$ ---------------------------------------------- 1.2
SO$_3$ ---------------------------------------------- 0.9
F ---------------------------------------------- 0.4
Mole ratio R$_2$O$_3$:P$_2$O$_5$ ---------------------------------------------- 0.06

In studying the two-stage ammoniation process of the prior art supra, we have found that the proportion of the P$_2$O$_5$ in the final product which is present in an unavailable form, i.e. in a form not available to the growing plant, increases both with an increase in the maximum operating temperature and also with an increase in the R$_2$O$_3$:P$_2$O$_5$ mole ratio of the feed acid. Thus, it may be seen that the operating variables in such a two-stage ammoniation process tend to offset one another's benefits and advantages in that it is now known that the proportion of P$_2$O$_5$ present in the polyphosphate form in the desired product increases both with an increase in maximum operating temperature and in the degree of ammoniation or fixation of ammonia reported as pounds of ammonia fixed per unit of P$_2$O$_5$. In the early stages of our work of the Getsinger two-stage ammoniation process with a particular feed acid, finished products containing more than about 5 pounds of ammonia fixed per unit of P$_2$O$_5$ could not be obtained. In later work, with the same feed acid in our newly discovered ammoniation process, we were able to fix upwards to 7 pounds of ammonia per unit of P$_2$O$_5$. Also, since more ammonia was fixed the temperature at which polyphosphate was formed was reduced and, at a given temperature, the polyphosphate level was increased.

Thus, it can be readily seen that we have discovered a new and improved process for the ammoniation of wet-process phosphoric acid which completely eliminates a separate step of concentrating said acid from merchant-grade strength up to the superphosphoric acid range and which new and improved process also results in the production of ammonium polyphosphate products containing substantially higher amounts of plant food wherein substantially greater proportions of amonia per unit of P$_2$O$_5$ can be fixed, and which products of higher plant food content, in addition to being a more highly concentrated fertilizer, contain substantially 100 percent of the P$_2$O$_5$ values in an available form suitable for use by the growing plant.

It is therefore an object of the present invention to produce improved stable liquid and solid mixed fertilizers containing upwards of about 45 percent total (N+P$_2$O$_5$) in the liquids and about 70 percent in the solids by a process employing the ammoniation of wet-process phosphoric acid and which liquid fertilizers form substantially no precipitates upon standing and storage.

Another object of the present invention is to provide improved stable liquid and solid mixed fertilizers containing upwards of about 45 percent (N+P$_2$O$_5$) in the liquids and about 70 percent in the solids by a process employing the ammoniation of wet-process phosphoric acid and which liquid fertilizers form substantially no precipitates upon standing and storage, and which wet-process phosphoric acid incorporated in our method contains a maximum of approximately 58 percent P$_2$O$_5$ prior to incorporation therein, thereby eliminating a separate concentrating step of raising the P$_2$O$_5$ content of said starting acid up to the superphosphoric range.

Still another object of the present invention is to provide improved stable liquid and solid mixed fertilizers containing upwards of about 45 percent (N+P$_2$O$_5$) in the liquids and about 70 percent in the solids directly from the ammoniation of commercial grade wet-process phosphoric acid containing a maximum of approximately 58 percent P$_2$O$_5$ by a relatively simple integrated process which simultaneously accomplishes the two functions of concentration and ammoniation, and which process further utilizes simultaneously, along with said concentration and ammoniation functions, the evaporation of water present in said acid in such a manner as to provide the necessary cooling of the ammoniation reaction, thereby eliminating the use of a separate, more expensive cooling medium.

A further object of the present invention is to provide improved stable liquid and solid mixed fertilizers containing upwards of about 45 percent (N+P$_2$O$_5$) in the liquids and about 70 percent in the solids directly from the ammoniation of commercial grade wet-process phosphoric acid containing a maximum of approximately 58 percent $P_2O_5$ by a relatively simple integrated process which simultaneously accomplishes the two functions of concentration and ammoniation, and which process further utilizes simultaneoutly, along with said concentration and ammoniation functions, the evaporation of water present in said acid in such a manner as to provide the necessary cooling of the ammoniation reaction, thereby eliminating the use of a separate, more expensive cooling medium, and in which process the evaporation of said water is from a relatively noncorrosive acid salt solution rather than from a highly corrosive acid, thereby allowing the use of less expensive materials of construction for the practicing of our process.

A still further object of the present invention is to provide improved stable liquid and solid mixed fertilizers containing upwards of about 45 percent ($N+P_2O_5$) in the liquids and about 70 percent in the solids directly from the ammoniation of commercial grade wet-process phosphoric acid containing a maximum of approximately 58 percent $P_2O_5$ by a relatively simple integrated process which simultaneously accomplishes the two functions of concentration and ammoniation, and which process further utilizes simultaneously, along with said concentration and ammoniation functions, the evaporation of water present in said acid in such a manner as to provide the necessary cooling of the ammoniation reaction thereby eliminating the use of a separate, more expensive cooling medium, and which process utilizes an ammoniation procedure which provides for the formation of the bulk of the polyphosphate after a large portion of the ammonia has been fixed and which allows the use of wet-process phosphoric acids containing relatively high $R_2O_3:P_2O_5$ mole ratios, i.e. up to about 0.1 while insuring, on the other hand, a highly desirable ammonium polyphosphate product containing substantially increased proportions of fixed ammonia and containing substantially all of its $P_2O_5$ values in a form available to the growing plant.

Still further and more general objects and advantages of the present invention will appear from the more detailed description set forth below, it being understood, however, that this more detailed description is given by way of illustration and explanation only and not by way of limitation, since various changes therein may be made by those skilled in the art without departing from the spirit and scope of the present invention.

We have discovered that the foregoing and other objects of the present invention can be attained by a process for the manufacture of improved stable liquid and solid mixed fertilizers from the ammoniation of ordinary merchant-grade wet-process phosphoric acid wherein the concentration and ammoniation of the wet-process phosphoric acid is combined and, further, wherein the resulting acyclic ammonium polyphosphates are made directly and continuously in situ by removal of free water from the system and by dehydration of substantial proportions of the orthophosphoric acid which originally comprised the wet-process phosphoric feed acid constituent. Thus, the novelty in our process resides in the combination of the simultaneous concentration, dehydration, and ammoniation of commercial grade wet-process phosphoric acid, together with our new and novel use of an ammoniation procedure whereby substantial portions of ammonia are fixed prior to formation of much of the polyphosphate thereby ensuring that substantially all of the $P_2O_5$ values therein in a polyphosphate form are available to the growing plant even when feed acids containing high amounts of $R_2O_3$ impurities are processed at relatively high operating temperatures.

We have discovered that the two-stage ammoniation procedure described by Getsinger is improved substantially in our novel process of fixing the bulk of the ammonia prior to formation of much of the polyphosphate if the partially neutralized acid withdrawn from the first stage is combined with the required amount of ammonia in an in-line mixer prior to introduction of the resultant mixture to the second stage rather than introduction of the partially neutralized acid and ammonia directly to the second stage as described by Getsinger. In this in-line mixer the bulk of the ammonia is fixed while the polyphosphate level is low and the resultant product contains substantially all of its $P_2O_5$ in a form available to the growing plant even when feed acids containing high amounts of $R_2O_3$ impurities are processed. As stated previously, when two-stage operation is attempted as described by Getsinger with acids containing high amounts of $R_2O_3$ impurities the ammonium polyphosphate product contains large proportions of $P_2O_5$ in form unavailable to the growing plant.

Our invention, together with further objects and advantages thereof, will be better understood from a consideration of the following description taken in connection with the accompanying drawings in which.

With reference to the in-line mixer many of those presently known in the art can be utilized such as, for example, those shown in Chemical Engineering, June 8, 1964, pages 165–220, or in Chemical Engineers Handbook, McGraw-Hill Book Co., Inc. (1950). It should however be noted that the in-line mixer must be capable of (1) intimately mixing the ammonia and partially neutralized acid and (2) fixing relatively large proportions of ammonia without the formation of large amounts of polyphosphate.

Figure 5:
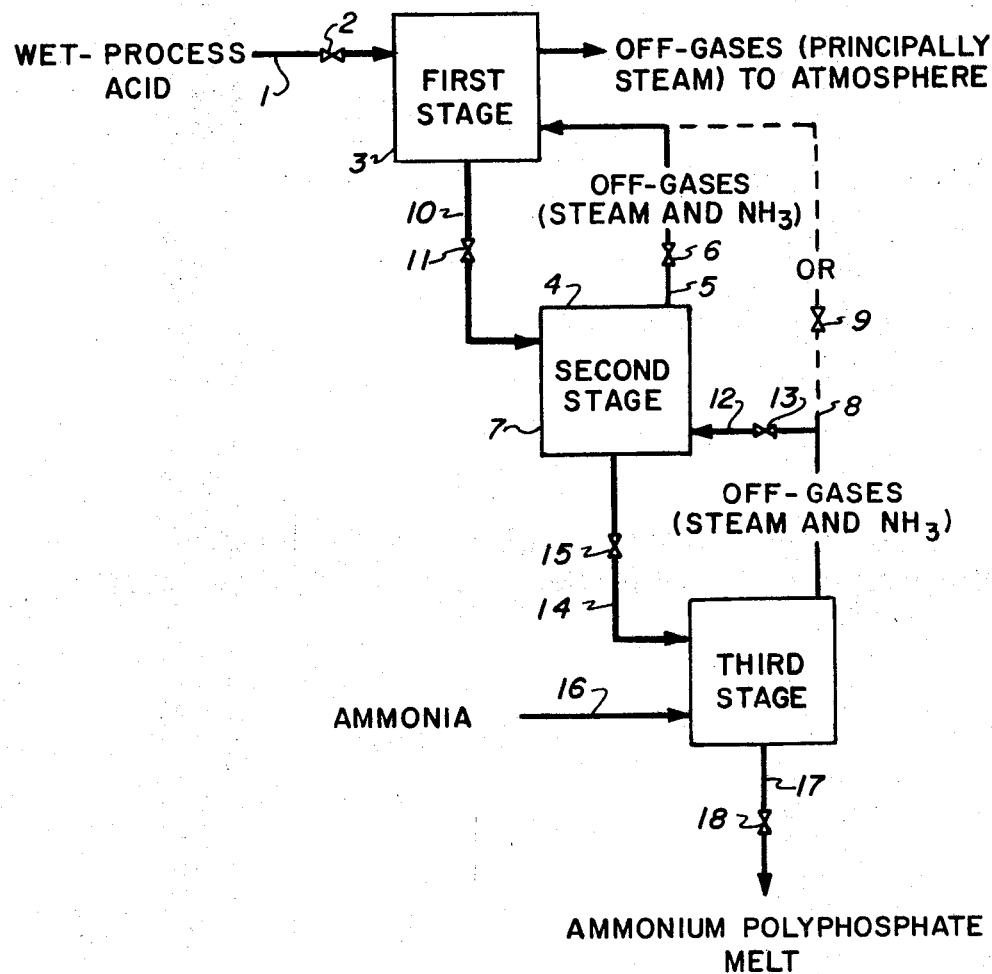

FIG. 5 is a flowsheet generally illustrating the principles of our novel process in one embodiment thereof utilizing three stages of ammoniation and the recycling of off-gases from the third- and second-stage ammoniation vessels. It should be understood that more than 3 stages also can be utilized. In another embodiment thereof proportions of ammonia may be added or fed independently to either the second stage or to the first- and second-stage ammoniation vessels in addition to its being fed to the third-stage ammoniating vessel, as is shown in the figure.

Figure 6:
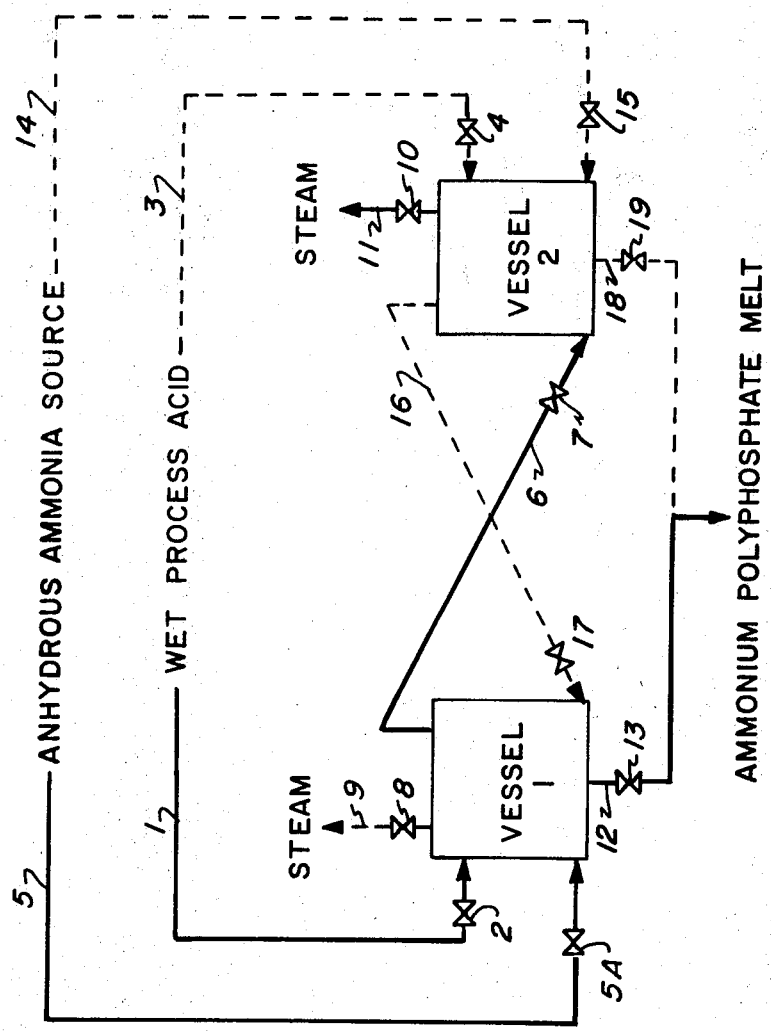

FIG. 6 is a flowsheet generally illustrating the principles of our novel process in one embodiment thereof utilizing batchwise ammoniation to form the desired product without significant loss of ammonia.

Figure 1:
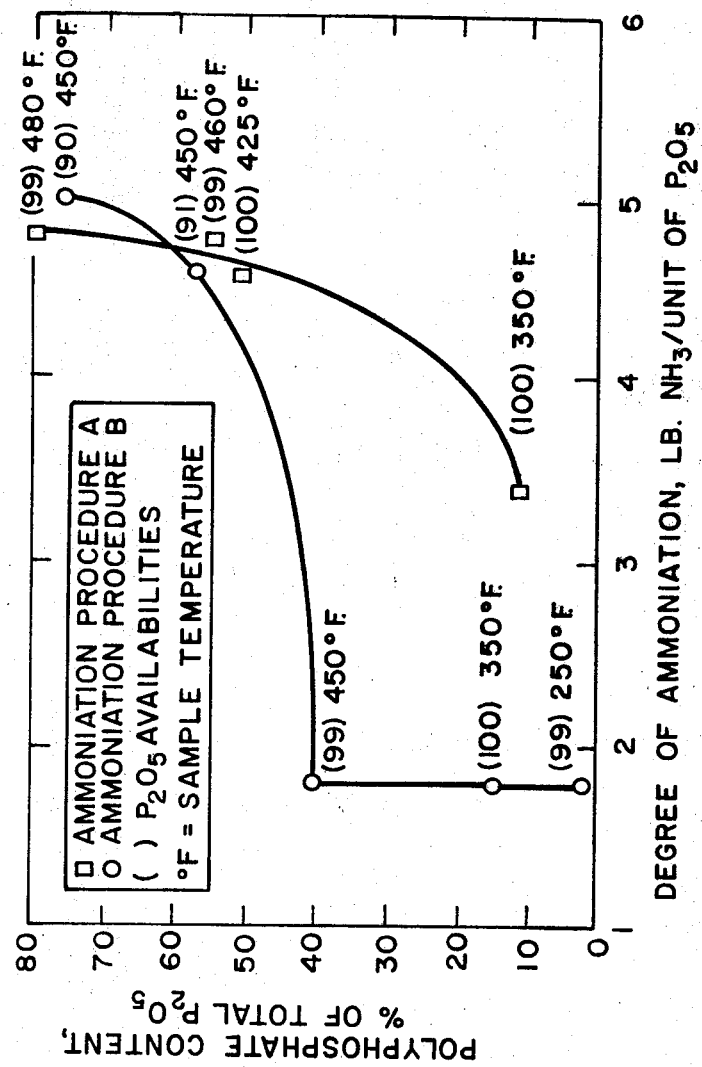
Figure 2:
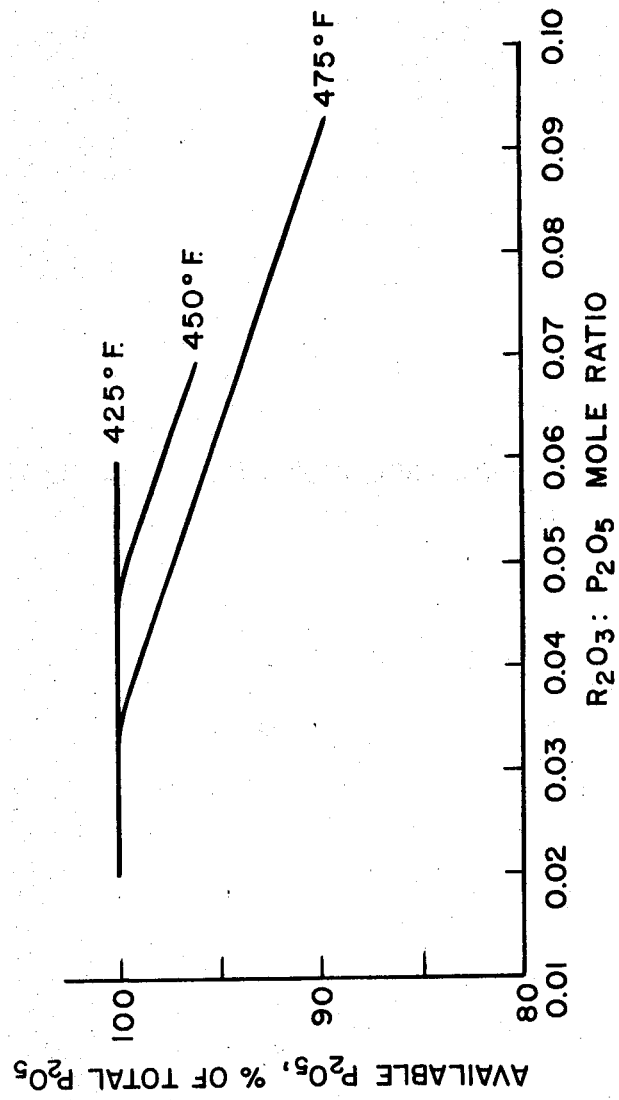
FIG. 2 is a diagrammatical illustration of the effect of impurity content and maximum reaction temperature on the $P_2O_5$ availability in products produced by the prior-art two-stage ammoniation of wet-process acid.

Referring now more specifically to FIG. 2, we have depicted herein a graphical illustration showing that when the two-stage ammoniation process of the prior art as described by Getsinger is followed the proportion of the $P_2O_5$ in the finished product which is present in an unavailable form, i.e. not useful to the growing plant, increases both with an increase in the maximum operating temperature and also with an increase in the $R_2O_3:P_2O_5$ mole ratio of the merchant-grade wet-process phosphoric feed acid.

Figure 3:
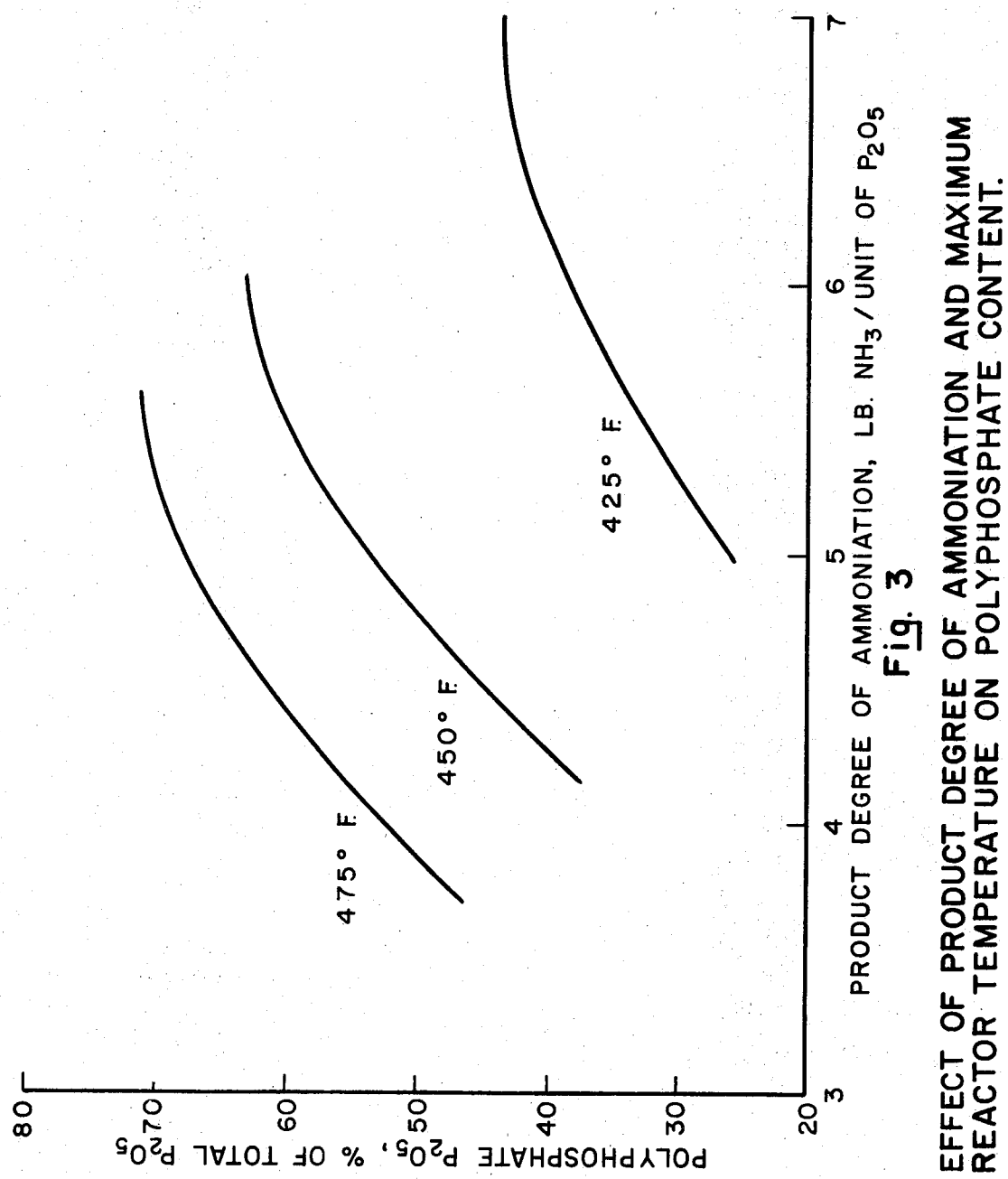
FIG. 3 is a diagrammatical illustration depicting the increase in the proportion of $P_2O_5$ in the product present in acyclic polyphosphate form with either an increase in maximum operating temperature and/or an increase in the degree of ammoniation or pounds of ammonia fixed per unit of $P_2O_5$ in the end product.

Referring now more specifically to FIG. 3, we have depicted graphically an illustration that the proportion of $P_2O_5$ present in the acyclic polyphosphate form increases both with an increase in the maximum operating temperature and with an increase in the degree of product ammoniation, i.e. pounds of ammonia fixed per unit of $P_2O_5$. Data from one acid used in our tests show, for example, that when the degree of ammoniation was held at about 5 pounds of ammonia per unit of $P_2O_5$, the proportion of P₂O₅ present as polyphosphate in the product increased from 25 percent to 65 percent as the maximum temperature was increased from 425° F. to 475° F. When the temperature was held at 425° F. the proportion of P₂O₅ as polyphosphate increased from 25 percent to 45 percent as the degree of ammoniation was increased from 5 to 6.5 pounds ammonia per unit of P₂O₅. The following tabulation illustrates in another manner the effect of the degree of ammoniation on the temperature to give a specified polyphosphate level.

| Lbs. NH₃/unit of P₂O₅: | Temp. (° F.) [1] |
|---|---|
| 0 (acid) | 560 |
| 3.5 | 475 |
| 4.2 | 450 |
| 6.2 | 425 |

[1] Required to give 40% of its P₂O₅ as polyphosphate.

Thus, for acids with moderate or high R₂O₃ contents, it is desirable to fix as much ammonia as possible to allow operation at reduced temperatures and thereby obtain products with high proportions of its P₂O₅ in available form and with high polyphosphate contents. Products of high polyphosphate contents also are desirable since the solutions prepared from them would be more concentrated and better sequestrants. High fixation of ammonia also increases the heat of reaction and reduces or eliminates any need for supplemental heat.

Figure 4:
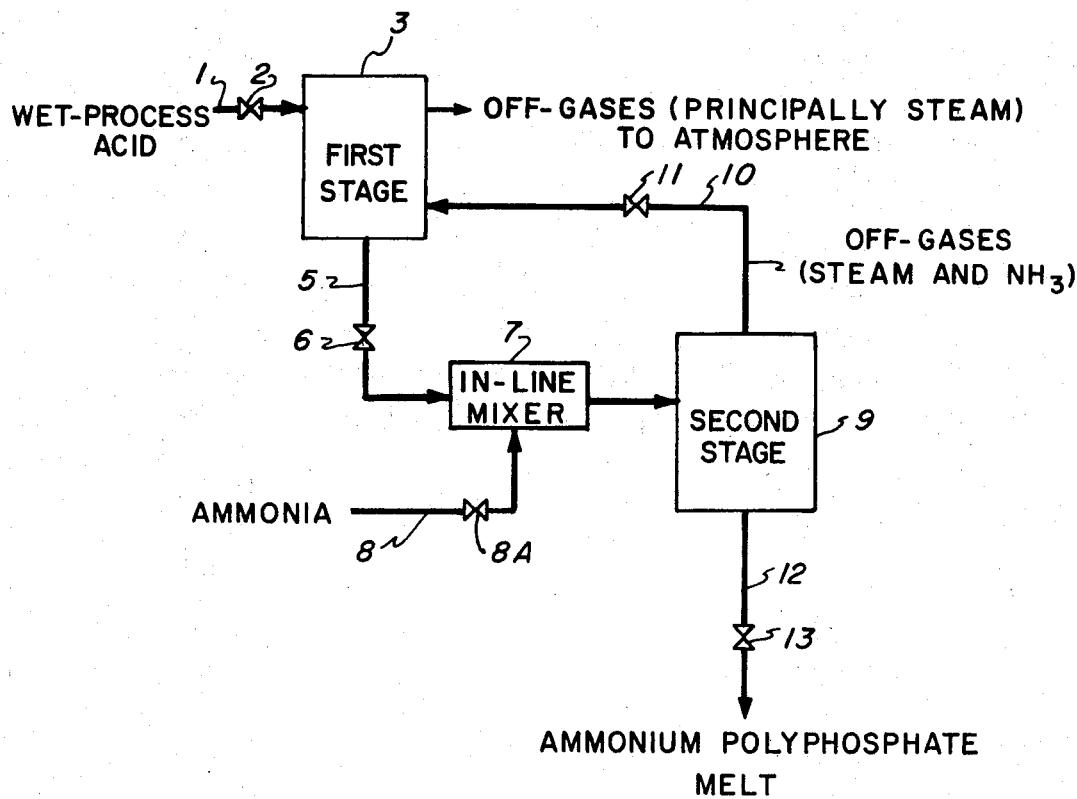
FIG. 4 is a flow sheet generally illustrating the principles of our novel process in one embodiment thereof utilizing two stages of ammoniation with an in-line mixer between the stages and the recycling of offgases from the second to the first stage ammoniation vessel.

Referring now more specifically to FIG. 4, we have depicted one embodiment of our new and novel process which utilizes countercurrent ammoniation of wet-process phosphoric acid and ammonia in two stages with in-line mixing of the partially neutralized acid and ammonia in an intermediate step between the first and second stages. Wet-process acid from a source not shown is fed via line 1 and means for control 2 into first-stage ammoniation vessel 3. Said first-stage ammoniation vessel 3 is provided with agitating and heating means not shown. First-stage ammoniation vessel recovers the unreacted ammonia from second stage ammoniation vessel 9 via line 10 and means for control 11 by the partial neutralization of the acid. Simultaneously, a stream of partially neutralized acid is removed from first stage ammoniation vessel 3 via line 5 and means for control 6 and is introduced into in-line mixer 7. Ammonia from a source not shown is introduced also in this mixer via line 8 and means for control 8A. The bulk of the ammonia present in the final product is fixed in this mixer. All of the water present in the partially neutralized acid entering this reactor leaves with the ammoniated material which results in the low polyphosphate content. The ammoniated material flows from in-line mixer 7 to second stage ammoniation vessel 9 where additional ammonia fixation occurs and the bulk of the polyphosphate is formed. Second stage ammoniation vessel 9 is equipped with agitation and heating means not shown. The offgases from ammoniation vessel 9 pass via line 10 and means of control 11 to first-stage ammoniation vessel 3. Simultaneously, ammonium polyphosphate melt is discharged via line 12 and means for control 13 to the appropriate facilities which are not shown where the melt is processed into either a solid or liquid fertilizer as desired. Alternatively, before the melt is allowed to solidify, a number of additives may be added thereto such as, for instance, the micronutrient or trace elements, potassium sources such as potassium chloride or potassium nitrate and supplemental nitrogen such as ammonium nitrate or urea. If a liquid fertilizer is desired, said product melt with or without the addition of more ammonia and/or supplemental materials may be dissolved directly in water. In this instance, the first stage may be eliminated and the ammonia and steam leaving the second-stage ammoniation vessel passed to the liquid fertilizer reactor. Alternatively, the melt may be solidified with agitation, such as obtained in a pugmill to give a granular solid ammonium polyphosphate product which may be used as a fertilizer alone or in admixture with supplemental materials or which product may be later formed into a liquid fertilizer by means of dissolving same in aqueous solution with or without additional ammonia.

Referring now more specifically to FIG. 5, it can be seen that one embodiment of our new, novel and improved process is essentially a countercurrent process for ammoniating and concentrating in situ merchant grade wet-process phosphoric acid in three stages for the production of desired ammonium polyphosphate melt high in available P₂O₅ and in degree of ammoniation. Wet-process phosphoric acid from a source not shown is fed via line 1 and means for control of flow 2 into first-stage ammoniator vessel 3. Said first-stage ammoniator vessel 3 is provided with agitating and heating means not shown. First-stage ammoniator vessel recovers the unreacted ammonia by the partial neutralization of the acid therein from the flow of the unreacted ammonia from second-stage ammoniator vessel 4 via line 5 and means for control of flow 6. In addition, or alternately, first-stage ammoniator vessel 3 may also recover unreacted ammonia by the partial neutralization of acid therein from the flow of excess and unreacted ammonia from third-stage ammoniator vessel 7 via line 8 and means for control of flow 9. Simultaneously, a stream of partially neutralized wet-process phosphoric acid is removed from first-stage ammoniator vessel 3 via line 10 and means for control of flow 11 and is introduced into second-stage ammoniator vessel 4. Under normal operating conditions, all of the offgases from third-stage ammoniator vessel 7 containing excess and unreacted ammonia therefrom are fed to second-stage ammoniator vessel 4 via line 12 and means for control of flow 13. Obviously, of course, in an alternate embodiment only a portion of the offgas from third-stage ammoniator vessel 7 may be fed to second-stage ammoniator vessel 4 and the remaining portion fed via line 8 and means for control of flow 9 back to first-stage ammoniator vessel 3. Subsequently, a stream of the further partially neutralized wet-process phosphoric acid reaction intermediate product from second-stage ammoniator vessel 4 is fed via line 14 and means for control of flow 15 to third-stage ammoniator vessel 7, together with a stream of ammonia from a source not shown fed to third-stage ammoniator vessel 7 via line 16, wherein said third-stage ammoniator vessel 7 there is maintained under equilibrium conditions for a preselected and predetermined residence time a melt of the desired ammonium polyphosphates comprising the product of our invention, which desired product is withdrawn from said third-stage ammoniator vessel 7 via line 17 and means for control of flow 18. In our process, first-stage ammoniator vessel 3, in addition to recovering all of the unreacted ammonia from either second-stage ammoniator vessel 4 or from both second-stage ammoniator vessel 4 and third-stage ammoniator vessel 7, removes all of the water that is removed from the process including that vaporized from the second and third stage ammoniator vessels 4 and 7, respectively, and this removal of water is generally illustrated by the arrow depicting the offgasing of steam from the partially neutralized acid in first-stage ammoniator vessel 3. In addition, the offgasing of the ammonia and water vapor from second- and third-stage ammoniator vessels 4 and 7, respectively, and introduction of same to first-stage ammoniator vessel 3 also acts to recover substantial portions of the heat evolved from the autogenous reactions in said second- and third-stage ammoniator vessels 4 and 7, respectively, which acts in effect to raise the temperature of the liquids in first-stage ammoniator vessel 3. In addition, the reaction products in second-stage ammoniator vessel 4, and the finished reaction product in third-stage ammoniator vessel 7, which is in the form of the ammonium polyphosphate melt, are maintained in a state of intimate mixing and may be heated by any suitable means not shown. We have found it desirable, in most instances, that the agitators be equipped with mechanical foam breakers to ensure the most desirable results, which foam breakers will be discussed more specifically infra. In addition, the intermediate reaction product in second-stage ammoniator vessel 4 and the finished ammonium polyphosphate melt in third-stage ammoniator vessel 7 are maintained under a positive pressure and one means for maintaining said pressure within second- and third-stage ammoniator vessels 4 and 7, respectively, can easily be obtained by throttling the gas flow to first-stage ammoniator vessel 3 by the control means 6 and 9, respectively. As has been mentioned, the product of our process is ultimately subsequently discharged from third-stage ammoniator vessel 7 via line 17 and means for control of flow 18 as a melt of acyclic ammonium polyphosphates. The product melt can subsequently be handled in any one of a number of ways to produce a desired liquid mixed fertilizer or alternately it may be allowed to solidify and granulated for use as a solid product. Alternatively, before the melt is allowed to solidify, a number of additives may be added thereto such as, for instance, the micronutrient or trace elements as is disclosed in the process in U.S. Pat. 3,244,500, Stinson et al. Other materials which might also be added at this stage would be potassium and nitrogen sources such as potassium nitrate, ammonium nitrate, potassium chloride, and urea. As has been mentioned, the product melt can subsequently be handled in any one of a number of ways. For instance, if a liquid mixed fertilizer is desired, said product melt may be dissolved directly in water with or without the addition of more ammonia and/or supplemental materials to yield a liquid ammonium polyphosphate fertilizer, the production of which is one of the objectives of the present invention. In this instance the first stage may be eliminated and the ammonia leaving the second stage in the offgases passed to the liquid fertilizer reactor. Alternately, the melt may be solidified with agitation, such as obtained in a pugmill to give a granular solid ammonium polyphosphate product which may be used as a fertilizer either alone or in admixture with other materials or which product in turn may be later formed into a liquid fertilizer by means of dissolving same in aqueous solution with or without additional ammonia.

Referring now more specifically to FIG. 6, we have depicted one method of batchwise ammoniation of wet-process acid to carry out the principles of our new and improved process. Two vessels are used; when reaction is carried out in vessel 1, the vessel 2 is used to recover ammonia from the offgases. Then vessel 2 would be used for the reaction and vessel 1 for recovery of the ammonia. This process could then be repeated. Wet-process acid from a source not shown is fed via line 1 and means for control of flow 2 into vessel 1 and via line 3 and means for control of flow 4 into vessel 2. Both reaction vessels are provided with agitating and heating means not shown. Ammonia is fed from a source not shown via line 5 and means for control of flow 5A to the acid therein in vessel 1 or through line 14 and means for control 15 to vessel 2. During the ammoniation in vessel 1, the flow of steam and unreacted ammonia is diverted to vessel 2 via line 6 and means for control of flow 7 while maintaining in a closed position valve 8 located on exhaust line 9 and furthermore while maintaining in an open position valve 10 located on exhaust line 11 and in addition having all other means for control of flow associated with the apparatus in the appropriate positions to allow the formation of ammonium polyphosphate in vessel 1 while recovering the unreacted ammonia by partial neutralization of wet-process acid in vessel 2 and at the same time allowing the steam from vessel 1 to be discharged via line 11 to the appropriate disposal means not shown. After ammoniation in vessel 1 is completed, the molten ammonium polyphosphate is discharged via line 12 and means for control of flow 13 to the appropriate facilities for conversion into solid or liquid fertilizer as desired. Supplemental materials such as urea, ammonium nitrate, potassium chloride, or sources of micronutrients may be incorporated in the solid or liquid fertilizer. In preparation for production of ammonium polyphosphate in vessel 2, wet-process acid is fed into vessel 1 via line 1 and means for control of flow 2 until the desired amount of acid is present in vessel 1. Ammonia, from a source not shown is then fed into vessel 2 via line 14 and means for control of flow 15 and reacted with the partially neutralized acid present in the vessel; the unreacted ammonia and steam from vessel 2 are then diverted to vessel 1 via line 16 and means for control of flow 17 by proper manipulation of the appropriate valves on the apparatus and furthermore, the excess steam from vessel 1 is then discharged to the appropriate disposal means not shown via line 9 and means for control of flow 8. The molten ammonium polyphosphate in vessel 2 is then discharged via line 18 and means for control of flow 19 to the appropraite facilities which are not shown where the melt is processed into either a solid or liquid fertilizer as desired. In this manner, the various batches of ammonium polyphosphate can be made in first vessel 1 and then vessel 2 without significant loss of ammonia.

Thus it can be seen that the fixation of significant amounts of ammonia prior to formation of large amounts of polyphosphates can be accomplished by the new, novel, and improved process which can be carried out batchwise or continuously in two, three or more stages not only results in a high degree of ammoniation but also in different relationships between $P_2O_5$ availability, temperature, and $R_2O_3:P_2O_5$ mole ratio; for a given $R_2O_3:P_2O_5$ mole ratio and temperature, the proportion of $P_2O_5$ in an available form is greater in our new and improved ammoniation process. Also, since more ammonia is fixed the temperature at which the polyphosphate $P_2O_5$ is formed is reduced and at a given temperature the polyphosphate level is increased. Examples of batch and continuous ammoniation processes for the production of the desired ammonium polyphosphate product are shown in Tables II, III, and IV. Composition of discharge from the in-line mixer in the two-stage ammoniation process is shown in Table V.

TABLE II.—PRODUCTION OF AMMONIUM POLYPHOSPHATE BY TWO-STAGE AMMONIATION OF WET-PROCESS ACIDS WITH IN-LINE MIXING

| Acid: | | | | | |
|---|---|---|---|---|---|
| $P_2O_5$ content, percent | 55.4 | 54.0 | 54.0 | 51.6 | 51.5 |
| $H_2O$ (Karl Fischer), percent | 16 | 17 | 23 | 21 | 22 |
| $Fe_2O_3:Al_2O_3$ mole ratio | 1.42 | 0.68 | 0.57 | 0.77 | 0.58 |
| $R_2O_3:P_2O_5$ mole ratio | 0.055 | 0.065 | 0.066 | 0.067 | 0.094 |
| Temperature, °F | 250 | 250 | 250 | 250 | 250 |
| Feed rate, g./min | 308 | 315 | 309 | 330 | 330 |
| First-stage reactor: | | | | | |
| Temperature, °F | 300 | 295 | 315 | 310 | 290 |
| Retention time, min | 2 | 2 | 2 | 2 | 2 |
| Lb. $NH_3$/unit $P_2P_5$ fed | 1.7 | 1.7 | 1.7 | 1.71 | 1.7 |
| Supplemental heat added | No | Yes | Yes | Yes | Yes |
| Composition of discharge: | | | | | |
| Total N, percent | 3.5 | 3.5 | 4.4 | 3.8 | 3.4 |
| Total $P_2O_5$, percent | 57.9 | 56.9 | 62.0 | 56.5 | 56.1 |
| Lb. $NH_3$/unit $P_2O_5$ | 1.4 | 1.5 | 1.7 | 1.6 | 1.5 |
| $H_2O$ (Karl Fischer), percent | 9 | 10 | 6 | 8 | 9 |
| Percent of total $P_2O_5$ as— | | | | | |
| Orthophosphate $P_2O_5$ | 99 | 100 | 94 | 98 | 98 |
| Polyphosphate $P_2O_5$ | 1 | <1 | 6 | 2 | 2 |
| Available $P_2O_5$ | 99 | 100 | 100 | 100 | 99 |
| Second-stage reactor: | | | | | |
| Temperature, °F | 450 | 450 | 465 | 450 | 450 |
| Retention time, min | 8 | 8 | 8 | 8 | 8 |
| Lb. $NH_3$/unit $P_2O_5$ fed | 5.0 | 5.0 | 5.0 | 5.0 | 5.0 |
| Type of mixing | T plus four paddles | | | | |
| Supplemental heat added | No | No | No | No | No |
| Product composition: | | | | | |
| Total N, percent | 11.8 | 11.7 | 11.9 | 11.9 | 10.4 |
| Total $P_2O_5$, percent | 58.7 | 58.7 | 61.8 | 58.7 | 58.3 |
| Lb. $NH_3$/unit $P_2O_5$ | 4.9 | 4.8 | 4.7 | 4.9 | 4.3 |
| Percent of total $P_2O_5$ as— | | | | | |
| Orthophosphate $P_2O_5$ | 55 | 54 | 47 | 49 | 46 |
| Polyphosphate $P_2O_5$ | 45 | 46 | 53 | 51 | 54 |
| Available $P_2O_5$ | 100 | 100 | 100 | 100 | 99 |
| W.S. $P_2O_5$ | 96 | 99 | 100 | 98 | 95 |
| $Fe_2O_3:Al_2O_3$ mole ratio | 1.21 | 0.57 | 0.51 | 0.78 | 0.72 |
| $R_2O_3:P_2O_5$ mole ratio | 0.058 | 0.067 | 0.064 | 0.073 | 0.095 |
| Condition of 10-34-0 liquids | Satisfactory | | | | |

TABLE III.—PRODUCTION OF AMMONIUM POLYPHOSPHATE BY THREE-STAGE AMMONIATION OF WET-PROCESS ACID [1]

| | Test number | | | | | | | | | | | |
|---|---|---|---|---|---|---|---|---|---|---|---|---|
| | 99-2 | | | 103-7 | | | 103-5 | | | 101-1 | | |
| Reactors | 1 | 2 | 3 | 1 | 2 | 3 | 1 | 2 | 3 | 1 | 2 | 3 |
| Acid (250° F.) rate, g./min | 390 | | | 148 | | | 148 | | | [2] 63 | | |
| NH₃ rate: | | | | | | | | | | | | |
| G./min | 27 | 47 | ([3]) | 9 | 18 | 25 | 9 | 18 | 25 | 3 | 9 | ([3]) |
| Lb. NH₃/unit P₂O₅ | 2.5 | 4.5 | | 2.2 | 4.5 | 6.2 | 2.2 | 4.5 | 6.2 | 2 | 5 | |
| Operating volume, ml | 1,540 | 100 | 320 | 1,540 | 320 | 550 | 1,540 | 320 | 550 | 550 | 100 | 320 |
| Pressure, p.s.i.g | <1 | <1 | <1 | <1 | <1 | <1 | <1 | <1 | <1 | <1 | <1 | <1 |
| Temperature, °F | 325 | 435 | 420 | 300 | 415 | 415 | 300 | 415 | 445 | 300 | 425 | 470 |
| Retention time, min | 8 | 0.4 | 2 | 20 | 4 | 8 | 20 | 4 | 8 | 16 | 3 | 10 |
| Composition of discharge from indicated reactors: | | | | | | | | | | | | |
| N, percent | 5.0 | 10.6 | 12.1 | 5.5 | 11.5 | 13.0 | 5.5 | 11.5 | 12.6 | 5.4 | | 12.1 |
| P₂O₅, percent | 60.9 | 60.3 | 59.6 | 58.8 | 59.9 | 59.6 | 58.8 | 59.9 | 60.4 | 58.9 | | 61.3 |
| Karl Fischer H₂O, percent | 5 | | | 6 | | | 6 | | | 7 | | |
| Lb. NH₃/unit P₂O₅ | 2.0 | 4.3 | 4.9 | 2.3 | 4.7 | 5.3 | 2.3 | 4.7 | 5.1 | 2.2 | | 4.8 |
| Percent of total P₂O₅ as— | | | | | | | | | | | | |
| Orthophosphate | 96 | 73 | 66 | 98 | 75 | 55 | 98 | 75 | 46 | | | 32 |
| Polyphosphate | 4 | 27 | 34 | 2 | 25 | 45 | 2 | 25 | 54 | | | 68 |
| W.S. P₂O₅ | | | 93 | | | 91 | | | 93 | | | 94 |
| Available P₂O₅ | 100 | 100 | 100 | 100 | 100 | 100 | 100 | 100 | 100 | 100 | | 99 |
| Mole ratio: | | | | | | | | | | | | |
| R₂O₃:P₂O₅ | | | | 0.061 | | | 0.061 | | | | | 0.062 |
| Fe₂O₃:Al₂O₃ | | | | 1.4 | | | 1.4 | | | | | 1.3 |
| 10-34-0 grade liquid condition | | | | | | | | Satisfactory | | | | |

[1] Acid (54.6% P₂O₅, 2.2% Fe₂O₃, 1.1% Al₂O₃; 0.064 R₂O₃: P₂O₅ mole ratio) made from Florida rock.
[2] Feed acid was at room temperature (80° F.).
[3] In these tests no provision made for measuring ammonia flow.

Ammonia added as required to give products with pH (5% water solution) of about 5; this results in products containing about 5 pounds ammonia per unit of P₂O₅.

TABLE IV.—AMMONIUM POLYPHOSPHATE FROM MERCHANT-GRADE WET-PROCESS ACID—BY BATCH AMMONIATION

| Acid: | | | |
|---|---|---|---|
| Chemical analysis, percent by wt.: | | | |
| Total P₂O₅ | 51.8 | | 54.9 |
| Fe₂O₃ | 1.8 | | 1.8 |
| Al₂O₃ | 2.2 | | 1.3 |
| SO₃ | 1.5 | | 0.9 |
| F | 1.7 | | 0.5 |
| R₂O₃:P₂O₅ mole ratio | 0.092 | | 0.062 |
| Fe₂O₃:Al₂O₃ | 0.52 | | 0.9 |
| Test No. | 29 | 30 | 11 |
| Maximum temperature, °F | 450 | 480 | 465 |
| Retention time, min | 16 | 15 | 12 |
| Pressure, p.s.i.g | <1 | <1 | <1 |
| Product: | | | |
| Chemical analysis, percent by wt.: | | | |
| Total N | 12.7 | 12.6 | 12.0 |
| Total P₂O₅ | 57.9 | 57.3 | 61.6 |
| Lb. NH₃/unit P₂O₅ | 5.3 | 5.3 | 4.7 |
| Percent of total P₂O₅ as— | | | |
| Orthophosphate | 52 | 51 | 38 |
| Polyphosphate | 48 | 49 | 63 |
| Available P₂O₅ | 99 | 98 | 99 |
| R₂O₃:P₂O₅ mole ratio | 0.090 | 0.091 | |

TABLE V.—AMMONIUM POLYPHOSPHATE FROM MERCHANT-GRADE ACID—COMPOSITION OF DISCHARGE FROM IN-LINE MIXER

| Acid: | | |
|---|---|---|
| Percent P₂O₅ | 51.6 | 51.6 |
| Mole ratios: | | |
| Fe₂O₃=Al₂O₃ | 0.77 | 0.77 |
| R₂O₃=P₂O₅ | 0.067 | 0.076 |
| Temperature, °F | 250 | 250 |
| Acid feed rate, g./min | 330 | 330 |
| First-stage reactor: | | |
| Temperature, °F | 300 | 315 |
| Retention time, min | 2 | 2 |
| Lb. NH₃/unit P₂O₅ fed | 1.7 | 1.7 |
| Composition of discharge: | | |
| Total N, percent | 3.3 | 3.7 |
| Total P₂O₅, percent | 57.1 | 58.2 |
| Lb. NH₃/unit P₂O₅ | 1.4 | 1.5 |
| Karl Fischer H₂O, percent | 11.2 | 9.3 |
| Percent of total P₂O₅ as— | | |
| Orthophosphate P₂O₅ | 93 | 96 |
| Polyphosphate P₂O₅ | 7 | 4 |
| Available P₂O₅ | 100 | 100 |
| Mixing tee: | | |
| Lb. NH₂/unit P₂O₅ fed | 5.0 | 5.0 |
| Composition of discharge: | | |
| Total N, percent | 10.8 | 11.0 |
| Total P₂O₅, percent | 57.3 | 58.1 |
| Lb. NH₃/unit P₂O₅ | 4.6 | 4.6 |
| Percent of total P₂O₅ as— | | |
| Orthophosphate P₂O₅ | 83 | 70 |
| Polyphosphate P₂O₅ | 17 | 30 |
| Available P₂O₅ | 100 | 100 |

After sifting and winnowing through the data and results of the tests and operations of our new, novel, and improved ammoniation and concentration in situ of wet-process phosphoric acid eliminating a separate concentration step and producing a highly desirable ammonium polyphosphate product high in available $P_2O_5$ and fixed ammonia, we now present the acceptable and preferred ranges of the operating variables in our process in Tables VIa and VIb below.

moniation process to yield the most desirable and required product to the operating variables of residence or retention time of the material in the two-stage reactors, principally the material in the second-stage reactor. In these studies we found that decreasing the second-stage retention time in a two-stage process from 10 minutes to 3½ minutes did not in fact improve the availability of the $P_2O_5$. In fact, we found in additional studies that decreasing the retention time in a two-stage ammoniation TABLE VIa.—PRODUCTION OF AMMONIUM POLYPHOSPHATE BY BATCH AND THREE-STAGE AMMONIATION—ACCEPTABLE AND PREFERRED RANGES OF VARIABLES

| Reaction variables | Batch process | Three-stage continuous-type process | | |
|---|---|---|---|---|
| | | First stage | Second stage | Third stage |
| $P_2O_5$ content of acid, percent by wt.: | | | | |
| Limits | (1) | (1) | | |
| Preferred | 53-55 | 53-55 | | |
| Acid temperature, °F: | | | | |
| Limits | (2) | (2) | | |
| Preferred | 200-250 | 200-250 | | |
| $R_2O_3:P_2O_5$ mole ratio of acid: | | | | |
| Limits | 0.001-0.10 | 0.001-0.10 | | |
| Preferred | 0.001-0.07 | 0.001-0.07 | | |
| Reaction temperature, °F.: | | | | |
| Limits | 200-600 | 200-400 | 300-500 | 350-600 |
| Preferred | 400-475 | 250-350 | 400-450 | 425-500 |
| Retention time, min.: | | | | |
| Limits | 1-180 | 1-180 | 1-180 | 1-180 |
| Preferred | 2-20 | 2-15 | 2-15 | 2-15 |
| Pressure, p.s.i.a.: | | | | |
| Limits | 0.5-1,000 | 0.5-1,000 | 0.5-1,000 | 0.5-1,000 |
| Preferred | 14.7-16 | 14.7-16 | 14.7-16 | 14.7-16 |
| Degree of ammoniation, lb. $NH_3$/unit of $P_2O_5$: | | | | |
| Limits | 3.5-9.5 | 0.1-3.0 | 2.5-5.5 | 3.5-9.5 |
| Preferred | 4.0-7.0 | 1.5-2.5 | 4.0-5.0 | 4.5-7.0 |
| Polyphosphate $P_2O_5$, percent of—total $P_2O_5$: | | | | |
| Limits | 10-80 | 0-15 | 15-40 | 30-80 |
| Preferred | 30-60 | 0-5 | 20-35 | 30-60 |

1 50 to 58% with wet-process orthophosphoric acid and 50 to 69% with electric furnace orthophosphoric acid.
2 60-boiling.

TABLE VIb.—PRODUCTION OF AMMONIUM POLYPHOSPHATE BY TWO-STAGE AMMONIATION UTILIZING IN-LINE MIXING OF FIRST-STAGE DISCHARGE AND AMMONIA—ACCEPTABLE AND PREFERRED RANGES OF VARIABLES

| Reaction variables | First stage | Second stage |
|---|---|---|
| $P_2O_5$ content of acid, percent by wt.: | | |
| Limits | (1) | |
| Preferred | 53-55 | |
| Acid temperature, °F.: | | |
| Limits | (2) | |
| Preferred | 200-250 | |
| $R_2O_3:P_2O_5$ mole ratio of acid: | | |
| Limits | 0.001-0.10 | |
| Preferred | 0.001-0.07 | |
| Reaction temperature, °F.: | | |
| Limits | 200-400 | 300-500 |
| Preferred | 250-350 | 400-450 |
| Retention time, min.: | | |
| Limits | 1-180 | 1-180 |
| Preferred | 2-15 | 2-15 |
| Pressure, p.s.i.a.: | | |
| Limits | 0.5-1,000 | 0.5-1,000 |
| Preferred | 14.7-16 | 14.7-16 |
| Degree of ammoniation, lb. $NH_3$/unit of $P_2O_5$: | | |
| Limits | 0.1-3.0 | 3.5-9.5 |
| Preferred | 1.5-2.5 | 4.0-7.0 |

1 50 to 80% with wet-process orthophosphoric acid and 50 to 60% with electric-furnace orthophosphoric acid.
2 60-boiling.

The following example, which is a negative example, is presented to further illustrate the desirability of using our new three-stage ammoniation procedure over the two-stage ammoniation procedure for the production in situ of ammonium polyphosphate is given by way of illustration and not by way of limitation. In our earlier work before we discovered and fully appreciated the present invention in the form now set forth, we considered the possibility of attributing the failure of the two-stage amprocess of the prior-art type down to one minute also did not improve the $P_2O_5$ availability.

The acids used in these tests were prepared by concentrating acid made by the TVA foam process. They contain 55 to 56 percent $P_2O_5$ and had $R_2O_3:P_2O_5$ mole ratios of about 0.06. The first-stage temperatures were in the range of 290° to 350° F. and retention time was in the range from 10 to 15 minutes. The second-stage temperature was 475° F.

To obtain the one-minute retention time a new second-stage reactor was installed; it was 3 inches in diameter and 12 inches high with a one-inch overflow pipe located three-fourths of an inch from the bottom of the reactor. The melt was agitated with propeller-type agitator. Two foam breakers were attached to the shaft. One foam breaker consisted of a piece of 6-mesh stainless steel screen mounted in a horizontal plane at the liquid level; the other, an egg-beater type, was mounted immediately above the screen. For convenience, instead of feeding offgas from the second stage to the first-stage reactor ammonia was fed to both stages in amounts that would be used in normal operation. No difficulties were encountered in the operation of the equipment. As will be seen the data indicate that $P_2O_5$ availability at a retention time in the second stage of a two-stage ammoniation process of one minute (97 percent available) was about the same as with 3.5 and 10 minutes retention. However, the proportion of polyphosphate decreased as the retention was decreased (58 percent at 10 minutes, 55 percent at 3.5 minutes, and 46 percent at 1 minute). The product degree of ammoniation (4.6–4.7 pounds of ammonia per unit of $P_2O_5$) was not related to the second stage retention time. The data from this series of tests in this negative example are shown in Table VII below.

TABLE VII.—AMMONIUM POLYPHOSPHATE FROM MERCHANT-GRADE WET-PROCESS ACID—EFFECT OF SECOND-STAGE RETENTION TIME ON $P_2O_5$ AVAILABILITY

Two-Stage Ammoniation Process of Prior Art

| Test No. | 94 | 2 | 1 |
|---|---|---|---|
| Acid: | | | |
|   $P_2O_5$ content, percent | [1] 56.2 | 55.0 | 54.9 |
|   $R_2O_3$:$P_2O_5$ mole ratio | 0.058 | 0.056 | 0.067 |
|   $Fe_2O_3$:$Al_2O_3$ mole ratio | 1.3 | 1.8 | 1.1 |
| Reactors (first stage/second stage): | | | |
|   Acid (250° F.) rate, g./min. | [2] 195/– | 325/– | 212/– |
|   $NH_3$ rate, g./min. | 13/32 | –/49 | –/30 |
|   Operating volume, ml. | 1,520/90 | 2,100/600 | 2,100/1,100 |
|   Temperature, ° F. | 345/475 | 310/475 | 290/475 |
|   Pressure, p.s.i.g. | <1/<1 | <1/<1 | <1/<1 |
|   Retention time, min. | 14/1 | 10/3.5 | 15/10 |
| Composition of discharge from first stage: | | | |
|   N-$P_2O_5$, percent by wt. | 6.1-62.3 | 5.4-60.8 | 4.2-59.0 |
|   Lb. free $NH_3$ unit $P_2O_5$ | 2.4 | 2.2 | 1.7 |
|   Percent of total $P_2O_5$ as polyphosphate | 9 | | |
|   Karl Fischer $H_2O$, percent by wt. | 2.8 | 5.5 | 9.2 |
|   Available $P_2O_5$, percent of total $P_2O_5$ | 100 | 100 | |
| Product composition: | | | |
|   Grade | 11.6-61.1-0 | 11.8-61-4-0 | 11.9-62.2-0 |
|   Lb. free $NH_3$/unit of $P_2O_5$ | 4.6 | 4.7 | 4.7 |
|   Percent of total $P_2O_5$ as— | | | |
|     Orthophosphate | 54 | 45 | 42 |
|     Polyphosphate | 46 | 55 | 58 |
|     W. S. $P_2O_5$ | 92 | 92 | 93 |
|     Available $P_2O_5$ | 97 | 95 | 97 |

[1] Acid produced from Florida phosphate rock. Analysis, percent by wt.: $P_2O_5$ 56.2; $Fe_2O_3$, 21.; $Al_2O_3$, 1.0; $SO_3$, 0.8; F, 0.5.
[2] Acid was preheated to 200° F.

While we have shown and described particular embodiments of our invention, modifications and variations thereof will occur to those skilled in the art. We wish it to be understood, therefore, that the appended claim is intended to cover such modifications and variations which are within the true scope and spirit of our invention.

What we claim as new and desire to secure by Letters Patent of the United States is:

1. In an improved process for the production of ammonium polyphosphates, said ammonium polyphosphates being in a form suitable for the manufacture of high-analysis solid and liquid mixed fertilizers and containing at least about 68 weight percent plant nutrients comprising nitrogen and phosphorus, said phosphorus expressed as $P_2O_5$, said ammonium polyphosphate derived from the reaction of anhydrous ammonia and orthophosphoric acid at elevated temperatures, said phosphoric acid selected from the group consisting of wet-process type and mixtures of electric-furnace and wet-process acids, and said ammonium polyphosphates having a physical form of a molten mass at said elevated temperatures, the improvement in combination therewith for ensuring that the ultimate ammonium polyphosphate product is in a form such that at least 99 percent of the $P_2O_5$ in said ammonium polyphosphate product is readily available to growing plants, said improvement consisting essentially of reacting in the ratio of from about 3 pounds to about 5 pounds of said anhydrous ammonia with each 20 pounds of $P_2O_5$ present in said phosphoric acid, when said phosphoric acid contains an $R_2O_3$:$P_2O_5$ mole ratio in the range from about 0.04 to about 0.1, wherein $R_2O_3$ refers to the amount of the two principal metallic impurities in said phosphoric acid, iron and aluminum, expressed as their oxides, said reacting of said 3 to 5 pounds of ammonia with said phosphoric acid being prior to both (1) the formation in said molten mass of greater than about 40 percent of the $P_2O_5$ as said acyclic ammonium polyphosphates, and (2) the attainment in said molten mass of a temperature in excess of about 425° F.; and subsequently maintaining an elevated temperature in said molten mass in the range of between about 425° F. and about 475° F., whereby is effected the formation in said molten mass of greater than about 40 percent of the $P_2O_5$ therein as said acyclic ammonium polyphosphate.

References Cited
UNITED STATES PATENTS 3,301,657  1/1967  Dee et al. _____ 71—43
3,382,059  5/1968  Getsinger _____ 71—51X REUBEN FRIEDMAN, Primary Examiner R. BARNES, Assistant Examiner U.S. Cl. X.R.

71—43; 23—107

PO-1050
(5/69)

UNITED STATES PATENT OFFICE
CERTIFICATE OF CORRECTION

Patent No. 3,562,778          Dated February 9, 1971

Inventor(s) Milton R. Siegel and Horace C. Mann, Jr.

It is certified that error appears in the above-identified patent and that said Letters Patent are hereby corrected as shown below:

Column 5, Table I, the fifth figure under heading "Temperature, °F." should be --430--
Column 5, Table I, in the footnote at the bottom of the page, the analys should appear as follows:

| Analysis, % by wt. | | | | | $R_2O_3:P_2O_5$ |
|---|---|---|---|---|---|
| Total $P_2O_5$ | $Fe_2O_3$ | $Al_2O_3$ | $SO_3$ | F | mole ratio |
| 54.6 | 2.3 | 1.2 | 0.9 | 0.4 | 0.068 |

Column 7, line 4, change "simultaneoutly" to -- simultaneously --
Column 12, Table II, third column opposite "Acid: $P_2O_5$ content percent, first line, change "54.0" to -- 54.4 --
Column 14, Table V, under heading "Mole ratios:" change "$Fe_2O_3=Al_2O_3$" t -- $Fe_2O_3:Al_2O_3$ -- and change "$R_2O_3 = P_2O_5$" to -- $R_2O_3:P_2O_5$ -- ; second column of figures, change "0.076" to --0.067 --
Column 15, Table VIb, footnote 1, should read as follows: -- 50 to 58% with wet-process orthophosphoric acid and 50 to 69% with electric-furnace orthophosphoric acid. --
Column 17, Table VII, under "Product composition:" and opposite "Grade" second column, change "11.8-61-4-0" to -- 11.8-61.4-0 --; in footnote 1, change "$Fe_2O_3$, 21" to -- $Fe_2O_3$, 2.1 --

Signed and sealed this 6th day of July 1971.

(SEAL)
Attest:

EDWARD M. FLETCHER, JR.
Attesting Officer

WILLIAM E. SCHUYLER,
Commissioner of Pate